United States Patent
Husemann et al.

(10) Patent No.: US 7,402,632 B2
(45) Date of Patent: Jul. 22, 2008

(54) 2-COMPONENT CROSSLINK OF END-FUNCTIONALIZED POLYACRYLATES

(75) Inventors: Marc Husemann, Hamburg (DE); Stephan Zöllner, Hamburg (DE)

(73) Assignee: tesa Aktiengesellschaft, Hamburg (DE)

( * ) Notice: Subject to any disclaimer, the term of this patent is extended or adjusted under 35 U.S.C. 154(b) by 309 days.

(21) Appl. No.: 10/496,324

(22) PCT Filed: Nov. 22, 2002

(86) PCT No.: PCT/EP02/13176

§ 371 (c)(1), (2), (4) Date: May 21, 2004

(87) PCT Pub. No.: WO03/046031

PCT Pub. Date: Jun. 5, 2003

(65) Prior Publication Data

US 2005/0009995 A1   Jan. 13, 2005

(30) Foreign Application Priority Data

Nov. 24, 2001 (DE) ................ 101 57 695
Jan. 8, 2002 (DE) ................ 102 00 363

(51) Int. Cl.
 *C08F 20/04* (2006.01)
 *C08F 20/10* (2006.01)
 *C08J 3/24* (2006.01)

(52) U.S. Cl. ............ 525/329.7; 525/329.8; 525/329.9; 525/330.1; 525/330.2; 525/330.3; 525/330.4; 525/330.5; 525/330.6; 526/222; 526/328

(58) Field of Classification Search .......... 525/329.7, 525/329.8, 329.9, 330.1, 330.2, 330.3, 330.4, 525/330.5, 330.6; 526/222, 328
See application file for complete search history.

(56) References Cited

U.S. PATENT DOCUMENTS

| 4,565,769 A | 1/1986 | Dueber et al. ............ 430/281 |
| 4,581,429 A | 4/1986 | Solomon et al. ............ 526/220 |
| 4,699,950 A | 10/1987 | Sato et al. ............ 525/185 |
| 4,758,626 A | 7/1988 | Ishihara et al. ............ 525/148 |
| 5,334,456 A | 8/1994 | Noren et al. ............ 428/431 |
| 5,391,665 A * | 2/1995 | Matsunaga et al. ............ 526/211 |
| 5,510,443 A | 4/1996 | Shaffer et al. ............ 528/45 |
| 5,693,848 A | 12/1997 | Esselborn et al. ............ 560/154 |
| 5,767,210 A | 6/1998 | Lecomte et al. ............ 526/317.1 |
| 5,789,487 A | 8/1998 | Matyjaszewski et al. ..... 525/301 |
| 5,811,500 A | 9/1998 | Dubois et al. ............ 526/145 |
| 5,854,364 A | 12/1998 | Senninger et al. ............ 526/192 |
| 5,888,644 A | 3/1999 | Yoshida et al. ............ 428/323 |
| 5,919,871 A | 7/1999 | Nicol et al. ............ 525/333.8 |
| 5,945,491 A | 8/1999 | Matyjaszewski et al. ..... 526/111 |
| 6,111,022 A | 8/2000 | Matyjaszewski et al. ..... 525/238 |
| 6,114,482 A | 9/2000 | Senninger et al. ............ 526/172 |
| 6,143,848 A | 11/2000 | Lee et al. ............ 526/212 |
| 6,479,608 B1 | 11/2002 | Nesvadba et al. ............ 526/328.5 |
| 2004/0049972 A1 | 3/2004 | Husemann et al. |

FOREIGN PATENT DOCUMENTS

| DE | 199 49 352 A1 | 4/2000 |
| EP | 0 205 846 A1 | 5/1986 |
| EP | 0 552 376 A1 | 8/1992 |
| EP | 0 708 115 A2 | 4/1996 |
| EP | 0 735 052 A2 | 10/1996 |
| EP | 0 824 110 A1 | 2/1998 |
| EP | 0 824 111 A1 | 2/1998 |
| EP | 0 826 698 A1 | 3/1998 |
| EP | 0 841 346 A1 | 5/1998 |
| EP | 0 850 957 A1 | 7/1998 |
| EP | 0 915 114 A1 | 5/1999 |
| EP | 915 114 A1 * | 5/1999 |
| WO | WO 86/00626 | 1/1986 |
| WO | WO 93/09152 | 5/1993 |
| WO | WO 96/24620 | 8/1996 |
| WO | WO 98/01478 | 1/1998 |
| WO | WO 98/13392 | 4/1998 |
| WO | WO 98/44008 | 10/1998 |
| WO | WO 99/31144 | 12/1998 |
| WO | WO 02/10309 A1 | 2/2002 |

OTHER PUBLICATIONS

Chiefari et al., Macromolecules 31 (1998) 5559-5562.*
Wikipedia article "RAFT (chemistry)," http://en.wikipedia.org/wiki/RAFT_%28chemistry%29, (Sep. 2006).*
U.S. Appl. No. 10/333,983 filed Jan. 28, 2003, Husemann et al.

* cited by examiner

*Primary Examiner*—Roberto Rábago
(74) *Attorney, Agent, or Firm*—Norris McLaughlin & Marcus PA

(57) ABSTRACT

Method for increasing the molecular weight of polyacrylates, in which polyacrylates, functionalized at least in part of their chain ends by functional groups X, are reacted with a compound having at least functional groups Y capable of linking reactions with functional groups X.

8 Claims, No Drawings

2-COMPONENT CROSSLINK OF END-FUNCTIONALIZED POLYACRYLATES

This is a 371 of PCT/EP02/13176 filed 22 Nov. 2002 (international filing date).

The invention relates to a process for increasing the molecular weight of polyacrylates and their derivatives, especially for crosslinking.

BACKGROUND OF THE INVENTION

Among producers of acrylate pressure sensitive adhesives (PSAs) there is a trend toward reducing the proportion of solvent in the production process. This relates in particular to the coating process, since here in general the polymers are coated from a solution with a concentration of 20 or 30% onto the corresponding carrier material and subsequently the solvent is distilled off again in drying tunnels. As a result of the heat introduced, the drying step may additionally be utilized for the thermal crosslinking of the PSA.

If it is then desired to reduce the solvent fraction or to eliminate it completely, polyacrylate PSAs can be coated from the melt. This is done at relatively high temperatures, since otherwise the flow viscosity would be too high and the adhesive would exhibit an extreme resilience during the coating operation. One example of a functioning commercial system is represented by the UV acResins™ from BASF AG. Here, a low flow viscosity at temperatures of less than 140° C. has been achieved by lowering the average molecular weight to below 300 000 g/mol. Accordingly, these materials are easy to coat from the melt. As a result of the lowering, however, there is also a deterioration in the technical adhesive properties, especially the cohesion, of these PSAs. In principle, the cohesion can be raised by UV or EB crosslinking. Nevertheless, the UV acResins™ do not achieve the level of cohesion attained by high molecular mass acrylate PSAs which have been applied conventionally from solution and crosslinked thermally.

A key problem is the network arc length, since acrylate hotmelt PSAs generally have a relatively low molecular weight, possess a relatively low fraction of interloops, and thus need to be crosslinked to a greater extent. Although the greater crosslinking does increase the level of cohesion, the distance between the individual crosslinks becomes smaller and smaller. Consequently, the network is significantly tighter and the PSA then possesses only a low level of viscoelastic properties.

Accordingly, there is a need for a polymer which is easy to coat from the melt and is subsequently crosslinked on the carrier material in film form in a specific way, so that, preferably, a linear polymer with only a very few crosslinking sites is formed.

Endgroup-functionalized polymers have already been known for a long time. In U.S. Pat. No. 4,758,626, for example, polyesters were impact modified using carboxyterminated polyacrylates. However, no description was given there of specific endgroup crosslinking.

U.S. Pat. No. 4,699,950 describes thiol-functionalized polymers and block copolymers. The polymers, however, contain only one functional group, which is subsequently used for polymerization or for other reaction.

U.S. Pat. No. 5,334,456 describes maleate- or fumarate-functionalized polyesters. Subsequent crosslinking takes place in the presence of vinyl ethers. Here again, polyacrylates are not described.

U.S. Pat. No. 5,888,644 describes a process for preparing release coating materials. Its starting point is formed by polyfunctional acrylates, which are reacted with polysiloxanes. Here again, no defined network is formed, so that this process too cannot be transferred to acrylate PSAs.

U.S. Pat. No. 6,111,022 describes poly(meth)acrylonitrile polymers prepared by ATRP. Terminally functionalized polymers can also be prepared by these processes. Advantageous processes for preparing purposively crosslinked PSAs are not disclosed, however.

In U.S. Pat. No. 6,143,848, terminally functionalized polymers are prepared by a new, controlled polymerization process. The polymerization process employed is an iodine transfer process. However, polymers of this type lack great thermal stability, since iodides generally react with air and are easily oxidized to iodine. Severe discolorations are a consequence. This applies in particular to hotmelt processes with high temperatures.

None of the aforementioned documents indicates a process in which endgroup-functionalized polyacrylates were mixed with a second component and reacted with it in a deliberate way in order to construct a linear polymer chain or a polymer network.

It is an object of the invention to specify a process for building up the molecular weight of polyacrylates, in particular for crosslinking thereof, which exhibits the disadvantages of the prior art only to a reduced extent, if at all.

Surprisingly, and unforeseeably for the skilled worker, this object is achieved by the process of the invention, as set out in the independent claim and in the subclaims.

SUMMARY OF THE INVENTION

The invention accordingly provides a process for increasing the molecular weight of polyacrylates, polyacrylates functionalized at least on some of their chain ends by suitable groups X being reacted with at least one compound containing at least two functional groups Y capable of entering into linking reactions with the functional groups X.

Here and below, the general term polyacrylates should be taken to include derivatives thereof and also polymethacrylates and derivatives thereof, additionally referred to as component (a).

DETAILED DESCRIPTION

In a first very advantageous version of the process the linking reactions are addition reactions. In a second very advantageous version of the process the linking takes place by way of substitution reactions. Substitution reactions are taken to mean, with particular advantage, esterification and trans-esterification reactions.

In a further, likewise very advantageous version of the process the polyacrylates containing the functional groups X are reacted in accordance with the invention with a compound containing at least two functional groups Y capable of bonding the polyacrylates using the functional groups Y. Bond formations of this kind are, for example, the bonding of the polyacrylates at two coordination centers, as a complex; in this sense functional centers as well should be understood as functional groups. In the respective compounds the respective functional groups X and Y are located at the chain ends of the compounds and are therefore also referred to below as functional endgroups.

The compounds containing functional groups Y are also referred to below as linking compounds and are designated component (b).

The polyacrylates functionalized with the groups X very advantageously have an average molecular weight (number average) $M_n$ in the range from 2000 g/mol to 1 000 000 g/mol. The process is consequently particularly suitable for the construction or for the crosslinking of polyacrylate PSAs.

For the purposes of the process of the invention an increase in molecular weight is understood in particular to refer to crosslinking, but also to the construction of molecules of higher molecular mass (longer-chain molecules). The process therefore allows compounds of high molecular mass to be constructed from the lower molecular mass components: in one version, which is particularly preferred for the process of the invention, the components (that is, the polyacrylates containing the functional groups X and the linking compounds containing the functional groups Y) are linked linearly to one another. Accordingly it is possible, for example, to construct high molecular mass alternating block copolymers from the low molecular mass components, with particular advantage in such a way that the blocks each correspond to one of the monomeric units. However, compounds already in block copolymer form can also be linked.

A further particularly preferred version of the process of the invention comprises the synthesis of crosslinked structures from the polyacrylates and the linking compounds. In this case it is very advantageous if at least one of the two components (polyacrylates and/or linking compounds) possess at least three functional terminal groups. In the sense of the invention, therefore, it is advantageous if the polyacrylates containing the functional groups X and/or the linking compounds containing the functional groups Y contain at least one and, where appropriate, preferably two or more chain branches, so that there are more than two chain ends.

With further advantage at least one of the two components then contains three or more functional groups Y.

The network density can be increased further by both components carrying at least three or more terminal functional groups. As the functionality goes up, so does the tendency to form networks. This is the case even when the number of functionalities rises for only one of the components.

In order to obtain particular desired linking results it is possible for di-, tri- and/or polyfunctional polyacrylates to be mixed with di-, tri- and/or polyfunctional linking compounds, and reacted.

The mixing ratio of the polyacrylates and of the linking compounds can be chosen freely, in accordance with the target property of the linked polymer. With advantage the amount of functional groups X corresponds essentially to that of functional groups Y. The molar ratio $n_Y/n_X$ of the number $n_Y$ of the functional groups Y of the linking compound to the number $n_x$ of the functional groups X of the polyacrylates is in each case preferably situated within a magnitude range of between 0.8 and 1.2, very preferably between 0.8 and 1.

Reference may be made with particular preference to the following reactions by way of example in this context; however, the list is not conclusive and is intended merely to illustrate the inventive process by reference to a number of exemplary linking reactions:

| Group X of component (a) on polymer side | Group Y of component (b) |
|---|---|
| Anhydride- | Hydroxy-, Alkoxy-, Mercapto-, Thiol-, Isocyanate-, Amino-, Oxazole-, . . . |

-continued

| Group X of component (a) on polymer side | Group Y of component (b) |
|---|---|
| Acid- | Hydroxy- |
| Ester- | Amino- |
| Hydroxy-Acid- | Isocyanate- |
| Hydroxy-, Alkoxy-, Mercapto-, Thiol-, Isocyanate-, Amino-, Oxazole-, . . . | Anhydride- |
| Hydroxy- | Acid- |
| Amino- | Ester- |
| Isocyanate- | Hydroxy-Acid- |

The abovementioned reactions proceed by way of addition or substitution reactions and are generally initiated by means of heat.

In the above exemplary examples, none of the linking sites has been characterized in any detail with regard to its chemical nature. The chemical nature is an automatic consequence—as the skilled worker will be well aware—of the different co-reactants X and Y. For this reason a precise description of the linking sites is not given. The major organic reactions can be found, for example, in Advanced Organic Chemistry, Reactions, Mechanisms and Structure, by Jerry March, Wiley Interscience 1992.

Polyacrylates Containing Functional Groups X

In a first version of the process of the invention it is possible to use linear polyacrylates having a terminal functional group X at each of the chain ends. In another preferred version branched, dendritic or star-shaped polyacrylates are used in the inventive process. These polymers also possess at least two functional endgroups X. In one preferred version the number of terminal functional groups X corresponds to the number of chain ends or side chain ends or arms of a star polymer.

Moreover, any linear, branched, dendritic or star-shaped poly(meth)acrylate may also carry two or more endgroups X at the respective chain end.

In general, a greater number of functional groups X raises the reactivity of the terminally functionalized polyacrylates.

In one preferred version of the process the polyacrylates used are composed of at least 50% by weight of acrylic and/or methacrylic acid derivatives of the general structure

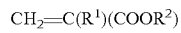

where $R^1$=H or $CH_3$ and $R^2$=H or linear, branched or cyclic, saturated or unsaturated, hydrocarbon radicals having from 1 to 30, in particular from 4 to 18, carbon atoms.

It is of advantage for the terminally functionalized polyacrylates to have a static glass transition temperature of from −100° C. to +25° C. For producing heat-activatable PSAs it is further of advantage to raise the static glass transition temperature further (preferably up to +175° C.).

For polyacrylate preparation the monomers are chosen such that the resulting polymers can be used for pressure sensitive adhesives at room temperature or higher temperatures, particularly such that the resulting polymers possess pressure sensitive adhesive properties in accordance with the "Handbook of Pressure Sensitive Adhesive Technology" by Donatas Satas (van Nostrand, New York, 1989). In order to obtain a preferred polymer glass transition temperature $T_G \leq 25°$ C., in accordance with the above remarks, the monomers are very preferably selected in such a way, and the quantitative composition of the monomer mixture advantageously chosen in such a way, that for the polymer the desired $T_G$ is obtained in accordance with the Fox equation (G1) (cf. T. G. Fox, Bull. Am. Phys. Soc. 1 (1956) 123).

$$\frac{1}{T_G} = \sum_n \frac{w_n}{T_{G,n}} \tag{G1}$$

In this equation, n represents the serial number of the monomers used, $w_n$ denotes the mass fraction of the respective monomer n (in % by weight), and $T_{G,n}$ denotes the respective glass transition temperature of the homopolymer of the respective monomer n, in K.

Preferably, use is made of acrylates and methacrylates having alkyl groups of 4 to 14 carbon atoms, preferably of 4 to 9 carbon atoms. Specific examples, without wishing to be restricted by this listing, include methyl acrylate, methyl methacrylate, ethyl acrylate, n-butyl acrylate, n-butyl methacrylate, n-pentyl acrylate, n-hexyl acrylate, n-heptyl acrylate, n-octyl acrylate, n-octyl methacrylate, n-nonyl acrylate, lauryl acrylate, stearyl acrylate, behenyl acrylate, and the branched isomers thereof, such as isobutyl acrylate, 2-ethylhexyl acrylate, 2-ethylhexyl methacrylate, isooctyl acrylate, and isooctyl methacrylate, for example.

Further classes of compounds which can be used include monofunctional acrylates and methacrylates of bridged cycloalkyl alcohols, composed of at least 6 carbon atoms. The cycloalkyl alcohols may also be substituted, by $C_{1-6}$ alkyl, halogen or cyano, for example. Specific examples include cyclohexyl methacrylates, isobornyl acrylate, isobornyl methacrylates, and 3,5-dimethyladamantyl acrylate.

Furthermore, in an approach which is very advantageous for the process, no use is made of vinyl compounds containing functional groups which adversely affect the coupling or crosslinking reaction of the functional groups X and Y with one another.

Furthermore, it is possible optionally to use monomers from the following groups as what are defined as vinyl monomers: vinyl esters, vinyl ethers, vinyl halides, vinylidene halides, and vinyl compounds containing α-positioned aromatic cycles and heterocycles. Here as well, selected monomers which can be used in accordance with the invention may be mentioned by way of example: vinyl acetate, vinylformamide, vinylpyridine, ethyl vinyl ether, 2-ethylhexyl vinyl ether, butyl vinyl ether, vinyl chloride, vinylidene chloride, acrylonitrile.

Advantageously, monomers are used which carry polar groups such as carboxyl, sulfonic and phosphonic acid, hydroxyl, lactam and lactone, N-substituted amide, N-substituted amine, carbamate, epoxy, thiol, ether, alkoxy, cyano or the like.

Examples of moderate basic monomers are N,N-dialkyl-substituted amides, such as N,N-dimethylacrylamide, N,N-dimethylmethylmethacrylamide, N-tert-butylacrylamide, N-vinylpyrrolidone, N-vinyllactam, dimethylaminoethyl methacrylate, dimethylaminoethyl acrylate, diethylaminoethyl methacrylate, diethylaminoethyl acrylate, N-methylolmethacrylamide, N-(butoxymethyl)methacrylamide, N-methylolacrylamide, N-(ethoxy-methyl)acrylamide, N-isopropylacrylamide, this list not being conclusive.

Further suitable, preferred examples of vinyl-functional monomers in the sense of the definition include hydroxyethyl acrylate, hydroxypropyl acrylate, hydroxyethyl methacrylate, hydroxypropyl methacrylate, N-methylolacrylamide, allyl alcohol, styrene, functionalized styrene compounds, maleic anhydride, itaconic anhydride, itaconic acid, benzoin acrylate, acrylated benzophenone, acrylamide, and glycidyl methacrylate, to name but several.

Moreover, advantageously, photoinitiators having a copolymerizable double bond are used. Suitable photoinitiators include Norrish I and II photoinitiators. Examples are e.g. benzoin acrylate and an acrylated benzophenone from UCB (Ebecryl P 36®). In principle it is possible to copolymerize any photoinitiators which are known to the skilled worker and which are able to crosslink the polymer by a free-radical mechanism under UV irradiation. An overview of possible photoinitiators which can be used and which can be functionalized with a double bond is given in Fouassier: "Photoinitiation, Photopolymerization and Photocuring: Fundamentals and Applications", Hanser-Verlag, Munich 1995. For further details it is possible to consult Carroy et al. in "Chemistry and Technology of UV and EB Formulation for Coatings, Inks and Paints", Oldring (ed.), 1994, SITA, London.

With further preference, comonomers which possess a high static glass transition temperature are added to the monomers described. Suitable components include aromatic vinyl compounds, such as styrene, in which case the aromatic nuclei are preferably composed of $C_4$ to $C_{18}$ units and may also contain heteroatoms. Particularly preferred examples include 4-vinylpyridine, N-vinylphthalimide, methylstyrene, 3,4-dimethoxystyrene, 4-vinylbenzoic acid, benzyl acrylate, benzyl methacrylate, phenyl acrylate, phenyl methacrylate, t-butylphenyl acrylate, t-butylphenyl methacrylate, 4-biphenyl acrylate and methacrylate, 2-naphthyl acrylate and methacrylate, and mixtures of those monomers.

An advantageous possibility is for one or more functional groups to be incorporated which allow radiation-chemical crosslinking of the polymers, in particular by means of UV irradiation or by irradiation with rapid electrons. With this objective, monomer units which can be utilized include, in particular, acrylic esters containing an unsaturated alkyl radical having from 3 to 18 carbon atoms and containing at least one carbon-carbon double bond. Acrylates modified with double bonds which are suitable with particular advantage include allyl acrylate and acrylated cinnamates. Besides acrylic monomers, monomers which can be used with great advantage for the polymer block also include vinyl compounds having double bonds which are not reactive during the (free-radical) polymerization. Particularly preferred examples of corresponding comonomers are isoprene and/or butadiene, but also chloroprene.

In a further version of the process, the polyacrylates contain one or more grafted-on sidechains. Systems of this kind can be prepared both by a graft-from process (polymerizational attachment of a sidechain starting from an existing polymer backbone) and by a graft-to process (attachment of polymer chains to a polymer backbone by means of polymer-analogous reactions).

For preparing sidechain polymers of this kind it is possible in particular to use, as monomers, monomers functionalized in such a way as to allow a graft-from process for the grafting-on of sidechains.

A preferred characteristic of the terminally functionalized polyacrylates is that their molecular weight $M_n$ is between about 2 000 and about 1 000 000 g/mol, preferably between 30 000 and 400 000 g/mol, with particular preference between 50 000 and 300 000 g/mol. Preferably the polydispersity of the polymer is less than 3, being the quotient formed from the mass average $M_w$ and the number average $M_n$ of the molar mass distribution.

In general, the reactivity of low molecular mass, terminally functionalized polyacrylates is higher, and so these are preferably employed for the reaction.

In order to prepare the terminally functionalized polyacrylates it is possible in principle to use all polymerizations which proceed in accordance with controlled or living mechanisms, thus including combinations of different controlled polymerization processes. In this context, without making any claim to completeness, mention may be made by way of example not only of anionic polymerization but also ATRP, GTRP (Group Transfer Radical Polymerization), nitroxide/TEMPO-controlled polymerization, or more preferably the RAFT process; in other words, particularly those processes which permit control of the block lengths and the polymer architecture and which additionally introduce a functional group into the polyacrylate. Also conceivable are conventional free-radical addition polymerizations, subject to the proviso that the initiator carries at least one functional group which remains in the polymer after the initiation as well.

In order to prepare the terminally functionalized polyacrylates it is possible to use different technologies as well. Besides anionic polymerization the polymers may also be prepared in emulsion or bead polymerization, solution polymerization, pressure polymerization or else bulk polymerization processes.

Free-radical addition polymerizations may be conducted in the presence of an organic solvent or in the presence of water or in mixtures of organic solvents and/or organic solvents with water, or without solvent. It is preferred to use as little solvent as possible. Depending on conversion and temperature, the polymerization time for free-radical processes is typically between 2 and 72 hours.

In the case of solution polymerization the solvents used are preferably esters of saturated carboxylic acids (such as ethyl acetate), aliphatic hydrocarbons (such as n-hexane, n-heptane or cyclohexane), ketones (such as acetone or methyl ethyl ketone), special-boiling-point spirit, aromatic solvents such as toluene or xylene, or mixtures of aforementioned solvents. For the polymerization in aqueous media or mixtures of organic and aqueous solvents, it is preferred to add emulsifiers and stabilizers for the purpose of polymerization. Polymerization initiators used with advantage for the controlled free-radical polymerizations include customary free-radical-forming compounds such as peroxides, azo compounds, and peroxosulfates, for example. Initiator mixtures are also outstandingly suitable.

For the synthesis of the polyacrylates it is possible to use nitroxide-controlled polymerization processes. For the preferred difunctional polyacrylates it is preferred to use difunctional initiators. One example of this are difunctional alkoxyamines (I).

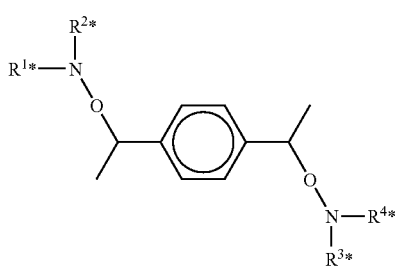

where $R^{1*}$, $R^{2*}$, $R^{3*}$ and $R^{4*}$ may be different, identical or chemically joined to one another and where pairs $R^{1*}$ and $R^{2*}$ and also $R^{3*}$ and $R^{4*}$ in each case contain at least one group X or possess a functional group which can be converted into X by chemical reaction. $R^{1*}$ to $R^{4*}$ are preferably independently of one another chosen as:
i) halides, such as chlorine, bromine or iodine, for example,
ii) linear, branched, cyclic and heterocyclic hydrocarbons having from 1 to 20 carbon atoms, which may be saturated, unsaturated or aromatic,
iii) esters —COOR$^{5*}$, alkoxides —OR$^{6*}$ and/or phosphonates —PO(OR$^{7*}$)$_2$, where $R^{5*}$, $R^{6*}$ and $R^{7*}$ stand for radicals from group ii),
iv) radicals from ii) where additionally at least one hydroxy function or silyl ether function is present.

For the preparation of the terminally functionalized polyacrylates by nitroxide-controlled polymerization it is also possible to use further, different alkoxyamines. From the basic synthesis design, the middle block, which following thermal initiation, initiation by thermal radiation or by actinic radiation forms two free radicals, can be additionally varied or modified further. The skilled worker is aware of a variety of chemical structures. A precondition is that at least 2 free radicals are formed which are stabilized by nitroxides which carry at least one functional group X or a group which is converted into X by means of a chemical reaction.

In one favorable procedure, nitroxides of type (II) or (III) are used for radical stabilization:

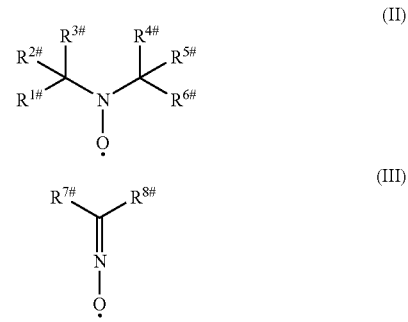

where $R^{1\#}$, $R^{2\#}$, $R^{3\#}$, $R^{4\#}$, $R^{5\#}$, $R^{6\#}$, $R^{7\#}$ and $R^{8\#}$ independently of one another denote the following compounds or atoms and preferably at least one of $R^{1\#}$ to $R^{6\#}$ and $R^{7\#}$ and/or $R^{8\#}$ carry at least one group X or contain a group which can be converted into the desired group X by means of a chemical reaction. $R^{1\#}$ to $R^{8\#}$ are preferably chosen independently of one another as:
i) halides, such as chlorine, bromine or iodine, for example,
ii) linear, branched, cyclic, and heterocyclic hydrocarbons having from 1 to 20 carbon atoms, which may be saturated, unsaturated or aromatic,
iii) esters —COOR$^{9\#}$, alkoxides —OR$^{10\#}$ and/or phosphonates —PO(OR$^{11}$)$_2$, where $R^{9\#}$, $R^{10\#}$ and $R^{11\#}$ stand for radicals from group ii),
iv) radicals from ii) where additionally at least one hydroxy function or silyl ether function is present.

Compounds of the above types (II) or (III) may also be attached to polymer chains of any kind (primarily such that at least one of the abovementioned radicals constitutes a polymer chain of this kind) and may thus be used, for example, as macroradicals or macroregulators for synthesizing terminally functionalized polymers.

Further general nitroxide-controlled processes for implementing controlled free-radical polymerizations are described below. U.S. Pat. No. 4,581,429 A discloses a controlled free-radical polymerization process which uses as its initiator a compound of the formula R'R"N—O—Y, in which Y denotes a free radical species which is able to polymerize unsaturated monomers. WO 98/13392 A1 describes open-chain alkoxyamine compounds which have a symmetrical substitution pattern. EP 735 052 A1 discloses a process for preparing thermoplastic elastomers having narrow molar mass distributions. WO 96/24620 A1 describes a polymerization process in which very specific radical compounds, such as phosphorus-containing nitroxides based on imidazolidine, are used. WO 98/44008 A1 discloses specific nitroxyls based on morpholines, piperazinones and piperazinediones. DE 199 49 352 A1 describes heterocyclic alkoxyamines as regulators in controlled-radical polymerizations. Corresponding further dev the corresponding free nitroxides improve the efficiency for the preparation of polyacrylates (Hawker, contribution to the National Meeting of The American Chemical Society, Spring 1997; Husemann, contribution to the IUPAC World Polymer Meeting 1998, Gold Coast).

All of the abovementioned processes can be employed, by introducing one or more functional groups X on the stabilized nitroxide radical and/or on the polymerization-initiating radical, for preparing endgroup-functionalized polyacrylates.

As a further controlled polymerization method it is possible with advantage to synthesize the block copolymers using Atom Transfer Radical Polymerization (ATRP), in which case preferred initiators are monofunctional or difunctional secondary or tertiary halides and the halide(s) is (are) abstracted using complexes of Cu, Ni, Fe, Pd, Pt, Ru, Os, Rh, Co, Ir, Ag or Au (EP 0 824 111 A1; EP 826 698 A1; EP 824 110 A1; EP 841 346 A1; EP 850 957 A1). The various possibilities of ATRP are further described in U.S. Pat. No. 5,945, 491 A, U.S. Pat. No. 5,854,364 A and U.S. Pat. No. 5,789,487 A. For preparing the terminally functionalized polyacrylates the corresponding secondary or tertiary halide ought already to carry the desired functional group X. Additionally, as a result of the polymerization process, halide endgroups remain in the polymer, and can likewise be converted into the corresponding functional groups X by means of substitution reactions. In order to prepare multiblock or star-shaped structures it is possible to proceed in accordance with the design described in Macromolecules 1999, 32, 231-234. There, polyfunctional halides are used for the polymerization, and must then be reacted in a substitution reaction by polymer-analogous means to give the desired functional group(s) X.

It may further be of advantage for the process of the invention to prepare endgroup-modified polyacrylates by way of an anionic polymerizati medium used preferably includes inert solvents, such as aliphatic and cycloaliphatic hydrocarbons, for example, or else aromatic hydrocarbons.

The living polymer is generally represented by the structure $P_L(A)$-Me, in which Me is a metal from group I, such as lithium, sodium or potassium, and $P_L(A)$ is a growing polymer block of the monomers A. The molar mass of the endgroup-modified poly(meth)acrylate to be prepared is dictated by the ratio of initiator concentration to monomer concentration.

For the synthesis of the polymer it is preferred to use acrylate and methacrylate monomers which do not adversely affect, let alone cause complete termination of, the anionic polymerization process.

For the preparation of blocklike terminally functionalized polyacrylates it may be of advantage to add monomers for the synthesis of one polymer block and then, by adding a second monomer, to attach a further polymer block. Alternatively, suitable difunctional compounds can be linked. In this way it is also possible to obtain starblock copolymers (P(B)—P(A))$_n$. In these cases, however, the anionic initiator ought already to carry the functional group, or the group ought to be obtainable by a subsequent polymer-analogous reaction.

For general anionic polymerizations, examples of suitable polymerization initiators include n-propyllithium, n-butyllithium, sec-butyllithium, 2-naphthyllithium, cyclohexyllithium, and octyllithium, with this list making no claim to completeness. Furthermore, initiators based on samarium complexes are known for the polymerization of acrylates (Macromolecules, 1995, 28, 7886) and can be used here. With these initiators, however, it must be borne in mind that only mono-endgroup-functional polyacrylates can be obtained by this route, by discontinuing the corresponding anionic polymerization. For the preparation of carboxyl groups this can take place, for example, by means of $CO_2$ with subsequent hydrolysis; for the preparation of hydroxyl groups, for example, by reaction with ethylene oxide and subsequent hydrolysis.

For preparing component (a) by anionic polymerization it is also possible to use difunctional initiators, such as 1,1,4,4-tetraphenyl-1,4-dilithiobutane or 1,1,4,4-tetra-phenyl-1,4-dilithioisobutane, for example. Coinitiators may likewise be employed. Suitable coinitiators include lithium halides, alkali metal alkoxides and alkylaluminum compounds. In one very preferred version the ligands and coinitiators are chosen such that acrylate monomers, such as n-butyl acrylate and 2-ethylhexyl acrylate, for example, can be polymerized directly and need not be generated in the polymer by transesterification with the corresponding alcohol. In order to generate the terminal functionalities these anionic polymerizations are discontinued such that at least one functional group is generated on the chain end. In the simplest case, for preparing hydroxyl groups, for example, scavenging is carried out with ethylene oxide, followed by hydrolysis.

Alternatively, for preparing terminally functionalized polyacrylates by anionic polymerization, difunctional initiators can be used which already contain at least one functional group in the polymer, which does not hinder the anionic polymerization process. Finally, at least one terminal functional group can be liberated on the poly(meth)acrylate by means of a polymer-analogous reaction as well.

A very preferred preparation process conducted is a variant of the RAFT polymerization (reversible addition-fragmentation chain transfer polymerization). The polymerization process is described in detail, for example, in the documents WO 98/01478 A1 and WO 99/31144 A1. Suitable with particular advantage for the preparation of terminally functionalized polyacrylates are trithiocarbonates of the general structure R'''—S—C(S)—S—R''' (Macromolecules 2000, 33, 243-245), by means of which one or more monomers (acrylates/methacrylates) are polymerized and portions of the regulator remain as endgroups in the polymer. In the simplest case, therefore, the trithiocarbonate may consist of one compound, where R''' contains a functional group X or a functional group which can be converted into a functional group X by means of a chemical reaction.

It may further be appropriate to carry out a two-stage polymerization. In a first step, monomers containing at least one functional group X are polymerized using a trithiocarbonate and then used in a second step to polymerize the (meth)acrylates. The polymerization may take place continuously or with discontinuation after the first stage, and subsequent reinitiation.

The latter method is particularly suitable for preparing terminally functionalized polyacrylates containing two or more functional groups X at each end.

In a version which is preferred for this variant, use is made, for example, of the trithiocarbonates (IV) and (V) for the polymerization, with φ (possibly being a phenyl ring, which is unfunctionalized or may be functionalized by alkyl or aryl substituents linked directly or via ester or ether bridges, or possibly being a cyano group.

In order to promote the polymerization, the control, and the rate of polymerization it may be of advantage to use substituted compounds. Examples of possible functionalizations include halogens, hydroxyl groups, epoxy groups, groups containing nitrogen or groups containing sulfur, although this list makes no claim to completeness. Some of these groups may in turn be used as functional groups X.

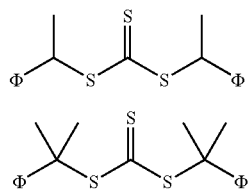

(IV)

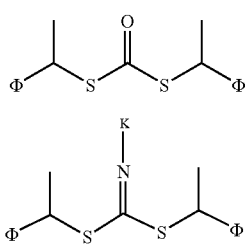

(V)

Besides trithiocarbonates, however, it is also possible to use the following structural elements for the controlled polymerization, with K being as defined below:

(VI)

(VII)

In order to prepare terminally functionalized polyacrylates with few groups X or only one group X, on the other hand, it may be an advantage to use terminally functionalized trithiocarbonates. In one particularly preferred version, use is made, for example, of trithiocarbonates of type VIII and IX.

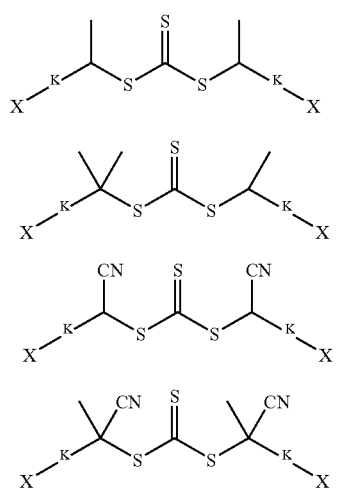

(VIII)

(IX)

(X)

(XI)

The group X ought not to influence the controlled free-radical polymerization. Moreover, the group κ is highly variable, in order to improve the control of the polymerization or to change the polymerization rate. K can be C, to C,B alkyl, $C_2$ to $C_{18}$ alkenyl, $C_2$ to $C_{18}$ alkynyl, in each case linear or branched; aryl, phenyl, benzyl, aliphatic and aromatic heterocycles. Furthermore, K can contain as one or more groups —$NH_2$, —NH—$R^{VI}$, —$NR^{VI}R^{VII}$, —NH—C(O) —$R^{VI}$, —$NR^{VI}$—C(O)—$R^{VII}$, —NH—C(S)—$R^{VI}$, —$NR^{VI}$—C(S)—$R^{VII}$,

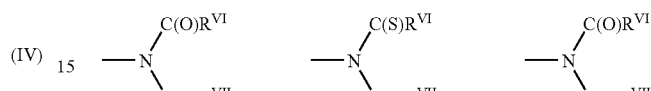

where $R^{VI}$ and $R^{VII}$ can in turn be compounds of the type $C_1$ to $C_{18}$ alkyl, $C_2$ to $C_{18}$ alkenyl, $C_2$ to $C_{18}$ alkynyl, in each case linear or branched; aryl, phenyl, benzyl, aliphatic and aromatic heterocycles, and are independent of one another or the same.

It is, however, also possible to use regulators which carry functionalized dithioester groups at the end and which incorporate these groups at the end of the polymer. Regulators of this kind can in the simplest case have the following structure (XII).

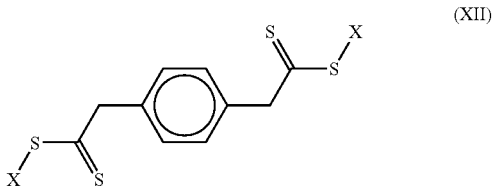

(XII)

In this case, however, the functional group ought not to influence the polymerization process but should instead remain on the sulfur atoms, so that this group is incorporated at the end of the polymer chain. Furthermore, the dibenzylic group can be further modified and adapted in order further to improve the polymerization properties. At this point mention may be made, merely by way of example, of patents WO 98/01478 A1 and WO 99/31144 A1.

In conjunction with the abovementioned controlled free-radical polymerizations, initiator systems are preferred which additionally comprise further free-radical polymerization initiators, especially thermally decomposing, radical-forming azo or peroxo initiators. In principle, however, any customary initiators that are known for acrylates are suitable. The production of C-centered radicals is described in Houben-Weyl, Methoden der Organischen Chemie, Vol. E19a, p. 60 ff. These methods are employed preferentially.

Examples of radical sources are peroxides, hydroperoxides and azo compounds. Some nonexclusive examples of typical radical initiators that may be mentioned here include potassium peroxodisulfate, dibenzoyl peroxide, cumene hydroperoxide, cyclohexanone peroxide, cyclohexylsulfonyl acetyl peroxide, di-tert-butyl peroxide, azodiisobutyronitrile, diisopropyl percarbonate, tert-butyl peroctoate, and benzpinacol. In one very preferred variant the free-radical initiator used is 1,1'-azobis(cyclohexylnitrile) (Vazo 88®, DuPont®) or 2,2-azobis(2-methylbutanenitrile) (Vazo 67®, DuPont®). It is also possible, furthermore, to use radical sources which release free radicals only under UV irradiation.

These initiators are also suitable, however, for the other free-radical polymerization methods that proceed in accordance with controlled-growth mechanisms.

In the case of the conventional RAFT process, polymerization is normally carried out only to low degrees of conversion (WO 98/01478 A1) in order to obtain very narrow molecular weight distributions. As a result of the low conversions, however, these polymers cannot be used as pressure sensitive adhesives and in particular not as hotmelt PSAs, since the high residual monomer fraction adversely affects the technical adhesive properties: the residual monomers contaminate the solvent recyclate in the concentration process and the corresponding self-adhesive tapes would exhibit very high outgassing. In order to circumvent this disadvantage of low conversions, in one particularly preferred version the polymerization is initiated a number of times.

In order to produce multiarm, star-shaped or dendritic terminally functionalized poly-acrylates it is likewise possible to employ the polymerization processes described above. Through modification of the initiating compound or of the regulator, such compounds are readily available. The following structures show examples of suitable compounds, the compound XIII being a suitable substance for preparing a 12-arm polyacrylate by an ATRP technique, the compound XIV being suitable for preparing a 6-arm polyacrylate by a RAFT technique, and the compound XV being suitable for preparing a 3-arm polyacrylate via nitroxide-controlled reaction.

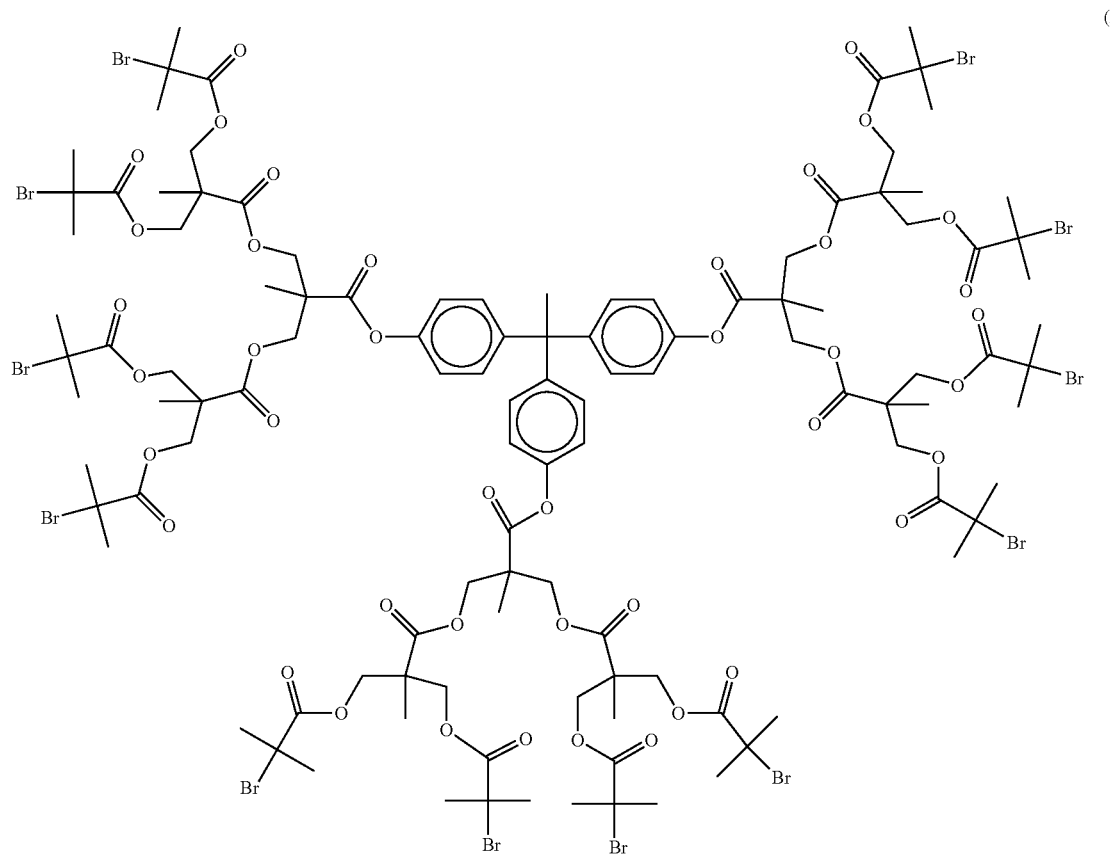

(XIII)

(XIV)

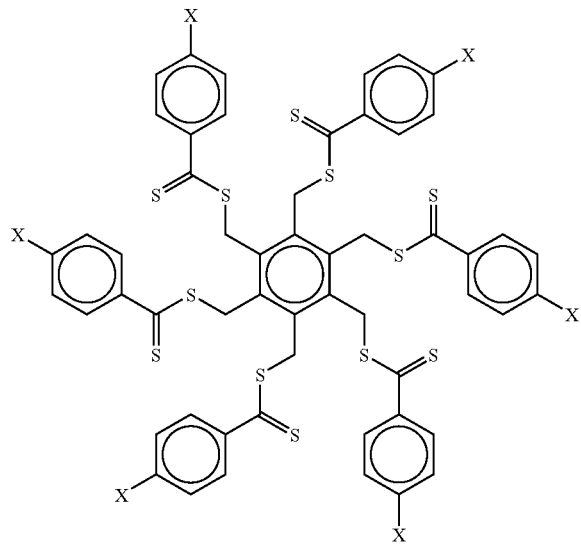

(XV)

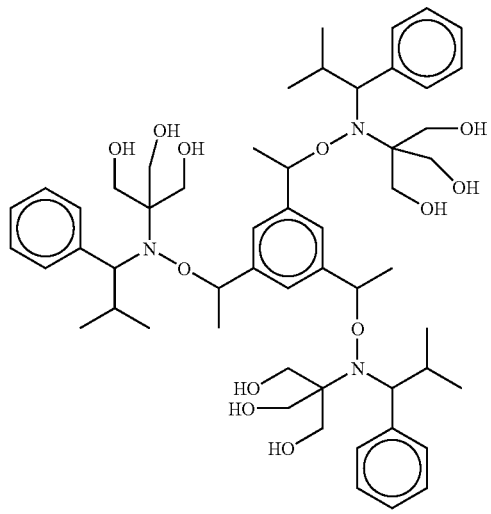

The abovementioned examples are intended only to be exemplary in nature. Polyacrylates prepared from compound XIII can be converted, for example, by reaction (substitution reaction) of the terminal bromides into suitable endgroup-functionalized polyacrylates. Polyacrylates prepared from compound XIV already possess one functional group X per polymer arm as endgroup. The regulator XIV may, however, also carry this functional group at another position on the terminal phenyl rings or else may carry two or more functional groups on the terminal phenyl rings. Polyacrylates prepared from compound XV already possess 3 hydroxyl groups per polymer arm as terminal functional groups, which can be used for reaction.

The number of arms produced can be controlled by the number of the groups which are essential for the controlled free-radical polymerization. Moreover, it is also possible to exchange, modify or targetedly substitute functional groups. By means of this measure it is possible, for example, to increase or lower the control or the rate of polymerization. Furthermore, all of the abovementioned polymerization methods depict only exemplary methods for preparing terminally functionalized polyacrylates. It is also possible, however, to employ all of the methods of controlled polymerization that are familiar to the skilled worker, provided this polymerization method allows the introduction of functional groups on the polymer, with particular preference functionalization at the poly(meth)acrylate chain end.

Besides the controlled free-radical methods, further free-radical polymerization methods are also suitable for introducing functional groups. By way of example mention may be made merely of thiol-regulated compounds, in which case the thiols or dithio compounds may likewise carry functional groups X and thus effect terminal functionalization of polyacrylates. Furthermore, functional groups can be introduced into the polymer as endgroups by means of the initiator. There exist, for example, commercial azo initiators, which carry free carboxylic acid groups or hydroxyl groups, which then, likewise by way of the polymerization, can be installed in the polymer at the ends and utilized for the coupling or crosslinking reaction. Another possibility would be to scavenge the free radical polymerization and in that way incorporate a functional group X.

Linking Compounds (Component (b))

Component (b) is used for linking the terminally functionalized polyacrylates. Depending on the field of use of the materials being prepared, these linking compounds possess different properties. For the inventive process it is preferred, however, that the linking compounds possess at least two terminal functional groups Y for reaction with the polyacrylates (component (a)) and that these functional groups Y enter into a chemical reaction with the functional group X of component (a).

As a result of the multiplicity of possible reactions it is possible as linking compounds to use not only organic compounds but also inorganic compounds. For certain applications, oligomers or polymers of compounds with the corresponding functional groups Y are likewise used.

Inorganic or organometallic compounds are used with great preference in order, for example, to synthesize high molecular mass networks of component (a) by way of complexations. At their most simple they may be metal salts, which are reacted with carboxylic acid groups of terminally functionalized polyacrylates. Examples of suitable metal salts are alkali metal halides or alkaline earth metal halides. For the inventive process it is of advantage if these salts are soluble in the polyacrylate (component (a)). Some examples are LiBr, LiCl, KBr, KI, magnesium bromide, and calcium bromide. It is also possible to use transition metal halides, such as zinc chloride or zinc bromide, for example. Metal chelate complexes are also suitable for coordinating endgroup-positioned carboxylic acid groups, such as aluminum acetylacetonate, titanium acetylacetonate, titanium tetraisopropoxide, titanium tetrabutoxide, zirconium acetylacetonate, and iron acetylacetonate, for example. These reactions proceed preferentially in a range of above 100° C. For further processing from the melt, reversible reactions may be of great advantage; that is, the metal salts possess only weak coordinative interactions at high temperatures and, when cooled to room temperature or service temperature, form strong ionic or coordinative bonds. As a result of this measure it is easy to mix components (a) and (b) in the melt, and after coating from the melt they form, for PSA applications, for example, high-viscosity, shearing-resistant pressure sensitive adhesives as they cool on the carrier.

For the process of the invention it may also be of advantage, however, if component (b) is not activated until after the mixing operation.

In a further very preferred version of the invention, organic compounds having at least one carbon atom and two functional groups Y are used for the process of the invention. Some examples of compounds having one carbon atom include malonic acid, malodinitrile, and methylenediamine. Examples of linking compounds having 2 carbon atoms and 2 functional groups Y are ethylene glycol and succinic acid. Examples of linking compounds having 3 carbon atoms for component (b) are glycerol, 1,3-propanediol, glutaric acid, and 1,3-diaminopropane. Examples of compounds having 4 carbon atoms are 1,4-butanediol, adipic acid, 1,2,4-butanetriol, butene-1,4-diol, 1,2,3,4-butanetetracarboxylic acid, 1,7-octadiene, diethylenetriamine, and dimethyl adipate.

Examples of compounds having 5 carbon atoms are 1,1,1-tris(hydroxymethyl)ethane, 1,5-pentanediol, and 1,5-diaminopentane. Examples of compounds having 6 carbon atoms are triethylene glycol, suberic acid, 1,6-diaminohexane, 1,4-diaminocyclohexane, 1,6-diisocyanohexane, N,N'-diallyltartaramide, and 1,4-diazabicyclo[2.2.2]octane. It is also possible to use aromatic linking compounds containing 6 carbon atoms, such as 1,2-phenylenediamine, 1,3-phenylenediamine, 1,4-phenylenediamine, hydroquinone, pyrocatechol, resorcinol, phthalic acid, terephthalic acid, pyromellitic dianhydride, pyromellitic diimide, pyromellitic acid, 1,3-dimercaptobenzene, and N,N,N',N'-tetramethyl-1,4-phenylenediamine. It is also possible advantageously to use compounds having up to 30 carbon atoms, which may be aliphatic or aromatic, may contain heterocycles and other cyclic structures, which may contain unsaturated sites, and/or which may contain the following heteroatoms: N, B, O, F, Cl, Br, I, Si, Al, P or S. The stated heteroatoms may also be present in conjunction with one another, e.g., in the form of a phosphate group, a sulfonate group or a nitro or nitroso group. Combination with one another is also possible, in the form of peroxo linkages, dithio linkages, and diaza linkages, for example.

For thermal activation it is possible, besides the reaction of difunctional and polyfunctional isocyanates, to use preferably blocked isocyanates as well. As component (b) the compounds possess the advantage that they can be activated for reaction thermally by means of energy (heat). An overview of blocked isocyanates is given in U.S. Pat. No. 5,510,443.

Besides the low molecular mass organic compounds it is also possible to use compounds of higher molecular mass (oligomers) or polymers as linking compounds. As oligomers and polymers use is made advantageously, for example, of polyacrylates, polymethacrylates, polyisobutene, polyethylene, polypropylene, polyvinyl acetate, polyurethane, polyvinyl chloride, polystyrene, polycaprolactam, polycaprolactone, polyester, polybenzoates, polysiloxanes, polyethylene/propylene copolymers, polybutadiene, polyisoprene, polybutene, polythiophene, polyacetylene, polyanthracene, polysilanes, polyamides, polycarbonates, polyvinyl alcohol, polypropylene oxide, polyethylene oxide, polyphenylene, polychloroprenes, and fluorinated oligomers and polymers. For the linking reaction, all these oligomers and polymers ought to contain at least two functional endgroups Y.

Reaction of Components (a) and (b):

Particularly, in the sense of the invention the process is operated in such a way that for the linking reaction the polyacrylates (component (a)) and the linking compounds (component (b)) are mixed in a reactor with a mixing apparatus. The coupling reaction may be carried out in solution or without any solvent. Endgroup-functionalized polyacrylates can therefore be reacted in solution, in which case the solvent used for the polymerization is preferably employed, or from the melt. For processing from the melt—if component (a) is prepared from solution—the solvent is removed from the polymer. This may take place most simply by applying vacuum or, generally, by distillation. Suitable means of concentration include concentrating extruders, for example, which are operated at low shear in order to avoid gelling during the hotmelt process. In accordance with the invention, therefore, the solvent is preferably stripped off in a concentrating extruder under reduced pressure, for which purpose it is possible, for example, to employ single-screw or twin-screw extruders which preferably distill off the solvent in different or identical vacuum stages and which possess a feed preheater. For the hotmelt process component (a) is preferably concentrated to more than 99.5%. Different kinds of reactors can be used for implementing the linking reaction. In this context the initial viscosity of the individual components and also the viscosity after the linking reaction are of critical significance. For implementation in a high-viscosity medium, extruders and co-kneaders are suitable with particular preference. Mixing equipment may likewise comprise twin-screw extruders or else ring extruders. In one very advantageous development of the invention, the components are combined (compounded) in the same reactor as that in which treatment (reaction) takes place, advantageously in an extruder. This may also be the extruder in which the concentration step has already been carried out.

Equipment which has proven very suitable for reaction with highly viscous components includes a twin-screw extruder (e.g., Werner & Pfleiderer or Welding Engineers) or a co-kneader (e.g., Buss). In these reactors the optimum reaction conditions are set by means of the length of the processing section, the throughput (rotary speed), the kneading temperature, and the amount of any catalysts added. The residence time within the reactor can be optimized by effectively mixing the reaction components.

In accordance with the flow viscosity of the components used, the reaction proceeds at increased temperatures. For high-viscosity systems the chosen temperatures are between 80 and 200° C., in one particularly preferred range between 110 and 160° C.

For the process of the invention it may likewise be of advantage to vary the molecular weight of the components—especially of the terminally functionalized polyacrylate—in order to improve ease of processing in the melt. Thus, for example, by reducing the molecular weight it is possible to lower the flow viscosity and so increase the readiness to react. Another point is the processibility under shear in an extruder, since relatively low-viscosity and low molecular mass polymers are easier to process in an extruder and the shearing introduced is thus greatly reduced.

For the inventive process it is of advantage to choose a continuous process regime and/or to operate individual steps of the process in an inline operation. However, the batchwise process regime is also possible.

For coupling from solution or for coupling very low-viscosity components, other reactors are generally used. Suitable in one very simple case, for example, are the kind of mixing heads known from the two-component polyurethane technology. Here, the two components are brought together in a chamber, with very rapid and efficient mixing of the two components occurring as a result of the flow or pressure. The reaction begins in the mixing chamber and may also continue, however, in the following processing operation. Also suitable for reaction from solution, for example, are very conventional stirred tanks, which for mixing may be provided with different stirrers. Examples of stirrers which can be used include anchor stirrers, propeller stirrers, and MIG stirrers, here again the viscosity being a critical factor. Overall, all of the mixing devices familiar to the skilled worker are suitable.

For the linking reaction it may also be an inventive advantage if the mixing devices can be heated and if it is therefore possible to introduce thermal energy which initiates or accelerates the linking reaction. The energy requirement is dependent on a number of factors, such as the activation energy of the chemical reaction and the molecular weight of the individual components, for example.

A further parameter specific to the process is the reaction time. The reaction time as well varies depending on the reactivity of the individual components, the temperature regime, and the viscosity. Accordingly, the reaction time can generally be shortened by means, for example, of an increase in temperature.

In one specific version of the inventive process, components (a) and (b) are only mixed and are reacted at a later point in time in the process.

One example is the processing of components (a) and (b) in an injection molding process, where shaping is followed by curing to retain the shape.

For the process of the invention it is of advantage if the conversion of the linking reactions is as quantitative as possible. Nevertheless, especially in the case of the linking of high molecular mass components, the reactivity is often fairly low, so that only significantly lower conversions can be realized. Instead, in some cases the possibility of side reactions exists. For the process of the invention, at least one linking reaction between a functional group X and Y ought to proceed successfully. For the reaction of low molecular mass components it is of particular advantage for the inventive process if a relatively high conversion of more than 50% is achieved. In one particularly preferred version, conversions of greater than 75%, based in each case on the reactive groups, are achieved.

For the preparation of a pressure sensitive adhesive by the process described above it may be advantageous to blend components (a) or (b) with tackifier resins before or after the linking reaction. In principle it is possible to use all resins which are soluble in the corresponding polymers. Suitable tackifier resins include, among others, rosin and its derivatives (rosin esters, including rosin derivatives stabilized by disproportionation or hydrogenation, for example), polyterpene resins, terpene-phenolic resins, alkylphenol resins, aliphatic, aromatic and aliphatic-aromatic hydrocarbon resins, to name but a few. Chosen primarily are those resins which are preferably compatible with component (a). The weight fraction of the resins is typically up to 40% by weight, more preferably up to 30% by weight. Furthermore, it is also possible optionally to add plasticizers, fillers (e.g., fibers, carbon black, zinc oxide, titanium dioxide, chalk, solid or hollow glass beads, microbeads made of other materials, silica, silicates), nucleators, blowing agents, compounding agents and/or aging inhibitors, in the form for example of primary and secondary antioxidants or in the form of light stabilizers.

In one preferred version of the invention the linking reaction of components (a) and (b) is followed by further crosslinking of the prepared polymer with actinic radiation.

Additional crosslinking operations are generally particularly useful if the polymers prepared by the abovementioned processes have been linked linearly.

Furthermore, however, it may be of advantage to carry out additional crosslinking of polymers already prepared by the process of the invention and crosslinked, and to achieve particular product properties. This applies in particular to coatings applications, since high degrees of crosslinking are necessary for the cure.

For optional crosslinking with UV light, UV-absorbing photoinitiators are optionally added to component (a) and/or (b) before or after the linking reaction. Useful photoinitiators which are very good to use include benzoin ethers, such as benzoin methyl ether and benzoin isopropyl ether, for example, substituted acetophenones, such as 2,2-diethoxyacetophenone (available as Irgacure 651® from Ciba Geigy®), 2,2-dimethoxy-2-phenyl-1-phenylethanone, dimethoxyhydroxyacetophenone, substituted α-ketols, such as 2-methoxy-2-hydroxypropiophenone, for example, aromatic sulfonyl chlorides, such as 2-naphthylsulfonyl chloride, for example, and photoactive oximes, such as 1-phenyl-1,2-propanedione 2-(O-ethoxycarbonyl)oxime, for example.

The abovementioned photoinitiators and others which can be used, including those of the Norrish I or Norrish II type, may contain the following radicals: benzophenone, acetophenone, benzil, benzoin, hydroxyalkylphenone, phenyl cyclohexyl ketone, anthraquinone, trimethylbenzoylphosphine oxide, methylthiophenyl morpholine ketone, aminoketone, azobenzoin, thioxanthone, hexaarylbisimidazole, triazine, or fluorenone, it being possible for each of these radicals additionally to be substituted by one or more halogen atoms and/or one or more alkyloxy groups and/or one or more amino groups or hydroxyl groups. A representative overview is given by Fouassier: "Photoinitiation, Photopolymerization and Photocuring: Fundamentals and Applications", Hanser-Verlag, Munich 1995. For further details, it is possible to consult Carroy et al. in "Chemistry and Technology of UV and EB Formulation for Coatings, Inks and Paints", Oldring (Ed.), 1994, SITA, London.

A further option in principle is to crosslink polymers, after the linking reaction, with electron beams. Typical irradiation equipment which may be used includes linear cathode systems, scanner systems, and segmented cathode systems, where electron beam accelerators are concerned. A detailed description of the state of the art, and the most important process parameters, can be found in Skelhorne, Electron Beam Processing, in Chemistry and Technology of UV and EB formulation for Coatings, Inks and Paints, Vol. 1, 1991, SITA, London. The typical acceleration voltages are situated in the range between 50 kV and 500 kV, preferably 80 kV and 300 kV. The scatter doses employed range between 5 to 150 kGy, in particular between 20 and 100 kGy.

For optional crosslinking with actinic radiation, difunctional or polyfunctional vinyl compounds are optionally added to component (a) and/or (b) before or after the linking reaction: in one preferred version, difunctional or polyfunctional methacrylates, in a very preferred version, difunctional or polyfunctional acrylates.

The polymers of the invention may be used with preference for producing pressure sensitive adhesive tapes. Depending on polymer composition, however, these polymers may also be used for film applications, as release coating materials, or as pressure sensitive adhesives. Highly halogenated polymers could also be used, however, as flame retardants, for example. Moreover, it is also possible to use the polymers prepared by the process of the invention as heat-activatable PSAs. For this utility the polymer ought to possess a glass transition temperature of more than 25° C. For the polymers with a close polymer network, applications in the coatings field are also possible. Polymers having a high glass transition temperature, prepared by the inventive process, may likewise be employed as thermoplastics. Given an appropriate choice of component (b), electrically conducting polymers are also possible. For example, it would also be possible to prepare polymers which, under current, emit light.

Test Methods

A. Shear Stability Times

The test took place in accordance with PSTC-7. A 50 μm thick pressure sensitive adhesive layer is applied to a 25 μm thick PET film. A strip of this sample 1.3 cm wide is bonded to a polished steel plate over a length of 2 cm, by rolling over it back and forth three times using a 2 kg roller. The plates are equilibrated for 30 minutes under test conditions (temperature and humidity) but without loading. Then the test weight is hung on, exerting a shearing stress parallel to the bond surface, and the time taken for the bond to fail is measured. If a holding time of 10 000 minutes is reached, the test is discontinued before the adhesive bond fails.

B. Bond Strength

The testing of the peel adhesion (bond strength) took place in accordance with PSTC-1. A 50 μm thick pressure sensitive adhesive layer is applied to a 25 μm thick PET film. A strip of this sample 2 cm wide is bonded to a steel plate by rolling back and forth over it three times using a 2 kg roller. The steel plate is clamped in and the self-adhesive strip is pulled off from its free end at a peel angle of 180° using a tensile testing machine.

C. Gel Permeation Chromatography GPC

The average molecular weight $M_w$ and the polydispersity PD were determined by the company Polymer Standards Service of Mainz, Germany. The eluent used was THF containing 0.1% by volume trifluoroacetic acid. Measurement was made at 25° C. The precolumn used was PSS-SDV, 5 μ, $10^3$ Å, ID 8.0 mm×50 mm. Separation was carried out using the columns PSS-SDV, 5 μ, $10^3$ and also $10^5$ and $10^6$ each of ID 8.0 mm×300 mm. The sample concentration was 4 g/l and the flow rate 1.0 ml per minute. Measurement was made against PMMA standards.

D. Gel Fraction

The carefully dried, solvent-free adhesive samples are welded into a pouch of polyethylene nonwoven (Tyvek web). The gel index, i.e., the toluene-insoluble weight fraction of the polymer, is determined from the difference in the sample weights before and after extraction with toluene.

Production of Test Specimens

Preparation of a RAFT Regulator:

The regulator bis-2,2'-phenylethyl trithiocarbonate (VIII) was prepared starting from 2-phenylethyl bromide using carbon disulfide and sodium hydroxide in accordance with the set of instructions in Synth. Comm., 1988, 18 (13), 1531. Yield: 72%. $^1$H-NMR (CDCl$_3$), δ: 7.20-7.40 ppm (m, 10 H); 3.81 ppm (m, 1 H); 3.71 ppm (m, 1 H); 1.59 ppm (d, 3 H); 1.53 ppm (d, 3 H).

Preparation of Nitroxides:

(a) Preparation of the Difunctional Alkoxyamine (XVII):

The procedure was carried out in analogy to the experimental instructions from Journal of American Chemical Society, 1999, 121(16), 3904. Starting materials used were 1,4-divinylbenzene and nitroxide (XVII).

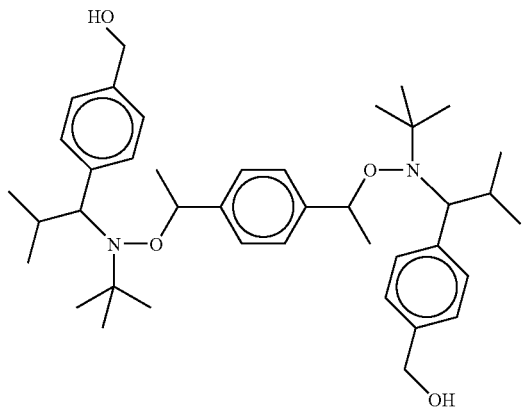

(XVII)

(b) Preparation of the Nitroxide (XVIII):

The procedure followed was analogous to the experimental instructions from Journal of Polymer Science, Polymer Chemistry, 2000, (38), 4749.

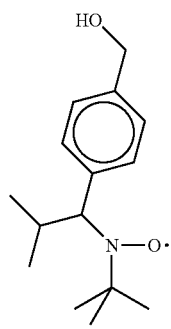

(XVIII)

Monomers:

The monomers for the nitroxide-controlled polymerizations were purified by distillation beforehand and stored under nitrogen. Hydroxyethyl acrylate was likewise purified by distillation and then stored under an argon atmosphere at −20° C.

Commercial Raw Materials Used:

| Trade name | Structure | Manufacturer |
| --- | --- | --- |
| Vazo 67 ® | 2,2'-Azobis(2-methylbutanenitrile) | DuPont |
| Vazo 64 ® | 2,2'-Azobis(isobutyronitrile) | DuPont |
| Starburst ® (PAMAM) | Dendrimer with 16 amino groups (generation 2) and an $M_w$ of about 3 256 g/mol | Sigma-Aldrich |
| Esacure KIP 150 ® | Oligomeric polyfunctional photoinitiator | Lamberti |

Amine-Functionalized UV Photoinitiator:

3-[4-(Dimethylamino)phenyl]-1-[4-(2-hydroxyethoxy)Phenyl]-2-propen-1-one (XIX):

A mixture of 15 g of 2-bromoethanol, 16.3 g of p-hydroxyacetophenone and 5.3 g of sodium hydroxide in 100 ml of dimethylformamide (DMF) was heated at 150° C. for 15 hours. The mixture was then poured into water and the product was extracted with dichloromethane. Subsequent vacuum distillation gave 11.4 g of a white solid (4-(2-hydroxyethoxy) acetophenone).

In a second reaction, a mixture of 8.3 g of p-dimethylaminobenzaldehyde, 10.0 g of 4-(2-hydroxyethoxy)acetophenone and 2.5 g of sodium hydroxide in 100 ml of methanol was heated at reflux for 10 hours. The reaction mixture was then cooled using an ice bath and filtered and the solid isolated by filtration was washed with cold methanol. The product was then dried in a vacuum drying cabinet at 40° C. and 10 torr. 10.2 g of white solid were isolated. The melting point was 128° C. (cf. U.S. Pat. No. 4,565,769, m.p.: 127-128.5° C.)

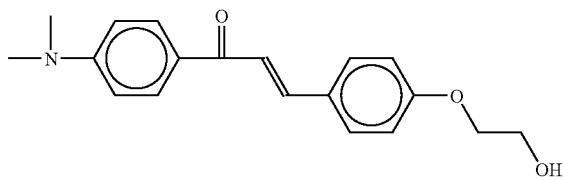

(XIX)

Preparation of a Functionalized RAFT Regulator, S, S-di(benzyl-4-phenylacetic acid)trithiocarbonate (XX)

5 g of 4-bromomethylphenylacetic acid were slowly deprotonated in 20 ml of an aqueous solution using 5 ml of 33% strength sodium hydroxide solution, with stirring.

In parallel, a three-necked flask was charged with 10 ml of carbon disulfide, 10 ml of 33% strength sodium hydroxide solution and also 0.92 g of n-butylammonium hydrogen sulfate. Through vigorous stirring, the emulsion changed in color from brown to blood-red. The solution prepared above was then slowly added in portions. The color of the emulsion changed to yellow. Following complete reaction (reaction time about 48 hours), the two phases were separated from one another in a separating funnel. The aqueous phase is extracted three times with carbon disulfide and then a number of times with special-boiling-point spirit. The organic phases are then combined and extracted by shaking a number of times with 0.1 N hydrochloric acid. The organic phase is dried over magnesium sulfate and then the solvent is removed on a rotary evaporator. The residue is an oily, reddish yellow liquid. The yield was 90%.

IR: 1 065 cm$^{-1}$ (C=S)

$^1$H-NMR (CDCl$_3$): δ=7.34 (8 H, m); 4.65 (4 H, s); 3.61 (4 H, s)

$^{13}$C-NMR (CDCl$_3$): δ=223 (SC(S)S); 178.2 (COOH)

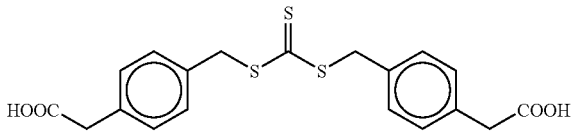

(XX)

Implementation of the Hotmelt Process in a Recording Extruder:

The compounding of the hotmelt PSAs was carried out using the recording extruder Rheomix 610p from Haake. The Rheocord RC 300p drive unit was available. The apparatus was controlled using the PolyLab System software. The extruder was charged in each case with 52 g of pure acrylate hotmelt PSA (~80% filling level). The experiments were conducted with a kneading temperature of 140° C., a rotary speed of 40 rpm, and a kneading time of 15 minutes.

Reference 1

A 2 L glass reactor conventional for free-radical polymerizations was charged with 40 g of acrylic acid, 0.4 g of bis-2,2'-phenylethyl trithiocarbonate and 160 g of DMF. The batch was rendered inert with nitrogen gas while being stirred with an anchor stirrer at room temperature for 1 hour. It was then heated to an internal temperature of 58° C. using an oil bath, after which 0.2 g of Vazo 64™ (from DuPont) (2,2'-azobis(isobutyronitrile)) in solution in 5 g of DMF was added. After a polymerization time of 24 hours, the batch was cooled to room temperature and DMF was distilled off on a rotary evaporator. Analysis by GPC (test C, PMMA standards) gave a molecular weight $M_n$ of 2 820 g/mol and $M_w$ of 7 540 g/mol.

Subsequently this oligomeric polyacrylate, 300 g of 2-ethylhexyl acrylate and 60 g of methyl acrylate were dissolved in 150 g of acetone/n-butanol (7:3) and the solution was rendered inert using nitrogen gas for 1 hour and then heated to an internal temperature of 58° C. again. At this temperature, 0.2 g of Vazo 64™(DuPont) (2,2'-azobis-(isobutyronitrile)) in solution in 5 g of acetone was added. The polymerization was conducted at a constant external temperature of 70° C. Following a reaction time of 6 hours, the batch was diluted with 80 g of acetone. After a reaction time of 24 hours, a further 0.2 g of Vazo 64™ (DuPont) (2,2'-azobis(isobutyronitrile)) in solution in 5 g of acetone was added. After 30 hours the batch was diluted with 50 g of acetone. The polymerization was terminated by cooling to room temperature after a reaction time of 48 hours. Analysis by GPC (test C, PMMA standards) gave a molecular weight Mn of 166 000 g/mol and $M_w$ of 421 000 g/mol.

Thereafter the solvent was removed in a drying cabinet at 60° C. under a vacuum of 10 torr and a 30% strength solution in acetone was prepared. This solution was then applied to a primed PET film 23 μm thick. After drying for 10 minutes at 120° C. in a drying cabinet, the application rate of the polymer was 50 g/m$^2$. The technical adhesive properties were tested by carrying out test methods A and B.

EXAMPLE 1

A 2 L glass reactor conventional for free-radical polymerizations was charged with 40 g of acrylic acid, 0.4 g of bis-2,2'-phenylethyl trithiocarbonate and 160 g of DMF. The batch was rendered inert with nitrogen gas while being stirred with an anchor stirrer at room temperature for 1 hour. It was then heated to an internal temperature of 58° C. using an oil bath, after which 0.2 g of Vazo 64™ (DuPont) (2,2'-azobis (isobutyronitrile)) in solution in 5 g of DMF was added. After a polymerization time of 24 hours, the batch was cooled to room temperature and DMF was distilled off on a rotary evaporator. Analysis by GPC (test C, PMMA standards) gave a molecular weight $M_n$ of 2 820 g/mol and $M_w$ of 7 540 g/mol.

Subsequently this oligomeric polyacrylate, 300 g of 2-ethylhexyl acrylate and 60 g of methyl acrylate were dissolved in 150 g of acetone/n-butanol (7:3) and the solution was rendered inert using nitrogen gas for 1 hour and then heated to an internal temperature of 58° C. again. At this temperature, 0.2 g of Vazo 64™ (DuPont) (2,2'-azobis-(isobutyronitrile)) in solution in 5 g of acetone was added. The polymerization was conducted at a constant external temperature of 70° C. Following a reaction time of 6 hours, the batch was diluted with 80 g of acetone. After a reaction time of 24 hours, a further 0.2 g of Vazo 64™ (DuPont) (2,2'-azobis(isobutyronitrile)) in solution in 5 g of acetone was added. After 30 hours the batch was diluted with 50 g of acetone. The polymerization was terminated by cooling to room temperature after a reaction time of 48 hours. Analysis by GPC (test C, PMMA standards) gave a molecular weight $M_n$ of 166 000 g/mol and $M_w$ of 421 000 g/mol.

Thereafter the solvent was removed in a drying cabinet at 60° C. under a vacuum of 10 torr, a 30% strength solution in acetone was prepared, 2% by weight aluminum acetylacetonate, based on the polymer, in a 3% strength solution in acetone were admixed to the polymer, and this polymer was applied from solution to a primed PET film 23 μm thick. After drying for 10 minutes at 120° C. in a drying cabinet, the application rate of the polymer was 50 g/m². The technical adhesive properties were tested by carrying out test methods A and B.

EXAMPLE 2

For carrying out example 2, the procedure of example 1 was repeated. Following preparation of the 30% strength solution in acetone, the polymer was reacted with 2.5% by weight 3-(2-aminoethylamino)propylamine and this solution was applied to a primed PET film 23 μm thick. After drying for 10 minutes at 120° C. in a drying cabinet, the application rate of the polymer was 50 g/m². The technical adhesive properties were tested by carrying out test methods A and B.

EXAMPLE 3

A 1 L glass reactor conventional for free-radical polymerizations was charged with 500 g of butyl acrylate, 50 g of methyl acrylate, 50 g of N-tert-butylacrylamide and 1.480 g of the difunctional alkoxyamine (XVII). Before the reaction is started, the entire mixture is cooled to −78° C. and degassed a number of times. It is then heated under pressure at 120° C. in the pressuretight vessel. The polymerization is terminated after 48 hours, the polymer being isolated and purified by dissolving it in dichloromethane and then precipitating it from methanol cooled at −78° C. The precipitate was filtered off on a chilled frit. The product obtained was concentrated in a vacuum drying cabinet at 45° C. and 10 torr for 12 hours. Analysis by GPC (Test C, PMMA standards) gave a molecular weight $M_n$ of 74 000 g/mol and $M_w$ of 123 000 g/mol.

The polymer was then dissolved in THF and mixed with 2% by weight 4-methyl-m-phenylene diisocyanate, based on the polymer. This solution was applied to a primed PET film 23 μm thick. After drying for 15 minutes at 140° C. in the drying cabinet, the application rate of the polymer was 50 g/m². The technical adhesive properties were tested by carrying out test methods A and B.

EXAMPLE 4

The polymer was prepared by the same procedure as in example 3. The polymer was then dissolved in THF and reacted with 2% by weight 1,2,7,8-diepoxyoctane and 0.05% by weight zinc chloride. This solution was applied to a primed PET film 23 μm thick. After drying for 15 minutes at 140° C. in the drying cabinet, the application rate of the polymer was 50 g/m². The technical adhesive properties were tested by carrying out test methods A and B.

EXAMPLE 5

A 2 L glass reactor conventional for free-radical polymerizations was charged with 40 g of dimethylaminoethyl acrylate, 0.4 g of bis-2,2'-phenylethyl trithiocarbonate and 100 g of acetone. The batch was rendered inert with nitrogen gas while being stirred with an anchor stirrer at room temperature for 1 hour. It was then heated to an internal temperature of 58° C. using an oil bath, after which 0.2 g of Vazo 64™ (DuPont) (2,2'-azobis(isobutyronitrile)) in solution in 5 g of acetone was added. After a polymerization time of 24 hours, a further 0.2 g of Vazo 64™ (DuPont) (2,2'-azobis(isobutyronitrile)) in solution in 5 g of acetone was added. After a reaction time of 48 hours, the batch was cooled to room temperature and acetone was distilled off on a rotary evaporator. Analysis by GPC (test C, PMMA standards) gave a molecular weight $M_n$ of 4 850 g/mol and $M_w$ of 8 790 g/mol.

Subsequently this oligomeric polyacrylate, 300 g of 2-ethylhexyl acrylate and 60 g of methyl acrylate were dissolved in 150 g of acetone and the solution was rendered inert using nitrogen gas for 1 hour and then heated to an internal temperature of 58° C. again. At this temperature, 0.2 g of Vazo 64™ (DuPont) (2,2'-azobis(isobutyronitrile)) in solution in 5 g of acetone was added. The polymerization was conducted at a constant external temperature of 70° C. Following a reaction time of 6 hours, the batch was diluted with 80 g of acetone. After a reaction time of 24 hours, a further 0.2 g of Vazo 64™ (DuPont) (2,2'-azobis(isobutyronitrile)) in solution in 5 g of acetone was added. After 30 hours the batch was diluted with 50 g of acetone. The polymerization was terminated by cooling to room temperature after a reaction time of 48 hours. Analysis by GPC (test C, PMMA standards) gave a molecular weight $M_n$ of 134 000 g/mol and $M_w$ of 376 000 g/mol.

Thereafter the solvent was removed in a drying cabinet at 60° C. under a vacuum of 10 torr, a 30% strength solution in acetone was prepared, 3% by weight adipic acid were admixed to the polymer, and this polymer was applied from solution to a primed PET film 23 μm thick. After drying for 10 minutes at 130° C. in a drying cabinet, the application rate of the polymer was 50 g/m². The technical adhesive properties were tested by carrying out test methods A and B.

EXAMPLE 6

A 2 L glass reactor conventional for free-radical polymerizations was charged with 360 g of 2-ethylhexyl acrylate, 40 g of methyl acrylate, 40 g of isobornyl acrylate, 0.6 g of S,S-di(benzyl-4-phenylacetic acid)trithiocarbonate (XX) and 150 g of acetone. The batch was rendered inert with nitrogen gas while being stirred with an anchor stirrer at room temperature for 1 hour. It was then heated to an internal temperature of 58° C. using an oil bath, after which 0.2 g of Vazo 64™ (DuPont) (2,2'-azobis(isobutyronitrile)) in solution in 5 g of acetone was added. After a polymerization time of 24 hours, a further 0.2 g of Vazo 64™ (DuPont) (2,2'-azobis (isobutyronitrile)) in solution in 5 g of acetone was added. After a reaction time of 48 hours, the batch was cooled to room temperature. Analysis by GPC (test C, PMMA standards) gave a molecular weight $M_n$ of 125 200 g/mol and $M_w$ of 187 500 g/mol.

Thereafter this polyacrylate was diluted to a 30% strength solution in acetone and mixed with 2% by weight 4-methyl-m-phenylene diisocyanate, based on the polymer. This polymer was applied from solution to a primed PET film 23 μm thick. After drying for 15 minutes at 140° C. in a drying cabinet, the application rate of the polymer was 50 g/m². The technical adhesive properties were tested by carrying out test methods A and B.

EXAMPLE 7

The polymer was prepared by the same procedure as in example 8. The polymer from example 8 was reacted with 1.5% by weight Starburst™ (PAMAM) Dendrimer Generation 2.0 (20% strength solution in methanol), the dendrimer containing 16 amino groups and having an $M_w$ of approximately 3 256 g/mol. This solution was applied to a primed PET film 23 μm thick. After drying for 15 minutes at 140° C. in the drying cabinet, the application rate of the polymer was 50 g/m². The technical adhesive properties were tested by carrying out test methods A and B.

Results:

In examples 1 and 2 a polymer with enriched polyacrylic acid in the endblocks was prepared. GPC analysis showed that not very many units can be located at the end of the polyacrylate block (according to $M_n$=1 410 g/mol per end).

If this polymer is then reacted, then the endblocks can be crosslinked in a targeted manner in the process of the invention. In example 1, crosslinking was carried out thermally using aluminum chelate. Besides aluminum chelate it is also possible to carry out crosslinking with polyfunctional amines, in which case the linking is via an ammonium salt.

Following examples 1 and 2, in which the endgroup-functionalized polyacrylates were prepared by way of the addition of monomer, in examples 3 and 4 the functional group was attached to the polymer by way of the regulating substrate. The polymer from example 3 and 4 was prepared by means of a hydroxy-functionalized regulator (XVII). The coupling of the hydroxy endgroups in the polyacrylate then took place ultimately, in example 3, by way of a difunctional isocyanate. For crosslinking of the hydroxy endgroup, it is also possible, however, to use a difunctional epoxide, in a reaction which takes place preferably catalyzed by Lewis acid. Accordingly, the coupling reaction in example 4 was carried out using zinc chloride as the catalyst.

In example 5, a polyacrylate was prepared, by means of trithiocarbonate regulator, which carries a plurality of amine endgroups on both polymer chain ends. For coupling it was reacted with adipic acid. In this case, again, the coupling reaction proceeds via an acid-base reaction.

In examples 6 and 7, a functionalized regulator was used. The trithiocarbonate XX possesses two carboxylic acid functions, which by way of the polymerization mechanism are incorporated into the polymer at the respective chain end. In example 6, the corresponding polymer was coupled with a difunctional isocyanate. In example 7, the species used for coupling was a dendrimer carrying 16 amine functions in the outer group. With this coupling it is possible to construct star polymers and also to crosslink them.

The table below summarizes the technical adhesive data. The table clearly indicates that the process of the invention is very suitable indeed for preparing pressure sensitive adhesives.

| Material | SST 23° C., 10 N [min] | BS-steel [N/cm] |
| --- | --- | --- |
| Reference 1 | 1 | 3.2 |
| Example 1 | 955 | 4.4 |
| Example 2 | 585 | 4.9 |

-continued

| Material | SST 23° C., 10 N [min] | BS-steel [N/cm] |
| --- | --- | --- |
| Example 3 | 710 | 3.9 |
| Example 4 | 915 | 3.6 |
| Example 5 | 785 | 4.0 |
| Example 6 | 680 | 4.2 |
| Example 7 | 470 | 4.4 |

Application rate: 50 g/m²
BS: Immediate bond strength to steel
SST: Shear stability times By means of the inventive crosslinking techniques chosen it is possible to raise the cohesion of prepared pressure sensitive adhesives markedly in comparison with the reference.

We claim:

1. A process for increasing the molecular weight of polyacrylates, wherein polyacrylates functionalized at least on some of their chain ends by functional groups X are prepared by the RAFT process using thiocarbonates selected from the group consisting of

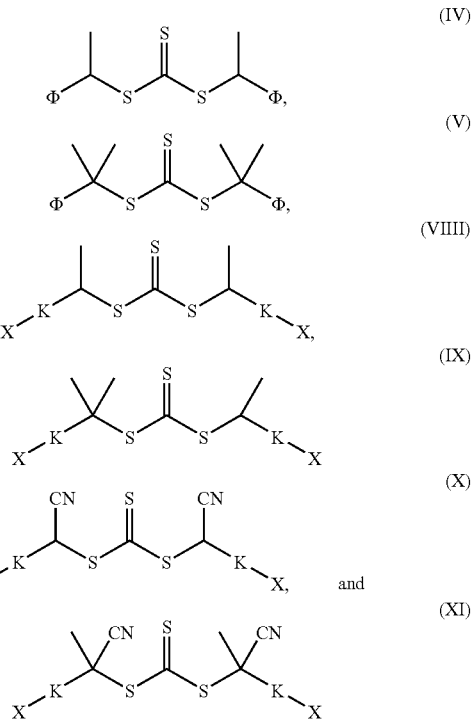

wherein Φ represents a phenyl ring, which is unfunctionalized or functionalized by alkyl or aryl substituents linked directly or via ester or ether bridges, or represents a cyano group and k represents $C_1$ to $C_{18}$ alkyl, $C_2$ to $C_{18}$ alkenyl, $C_2$ to $C_{18}$ alkynyl, in each case linear or branched; aryl, phenyl, benzyl, aliphatic or aromatic heterocycle and optionally contains one or more groups selected from the group consisting of —NH$_2$, —NH—R$^{VI}$, —NR$^{VI}$R$^{VII}$, —NH—C(O)—R$^{VI}$, —NR$^{VI}$—C(O)—R$^{VII}$, —NH—C(S)—R$^{VI}$, —NR$^{VI}$—C(S)—R$^{VII}$,

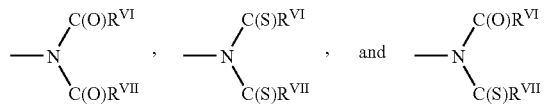

where R$^{VI}$ and R$^{VII}$ are C$_1$ to C$_{18}$ alkyl, C$_2$ to C$_{18}$ alkenyl, C$_2$ to C$_{18}$ alkynyl, in each case linear or branched; aryl, phenyl, benzyl, aliphatic or aromatic heterocycles, and are independent of one another or the same, and are then reacted with at least one compound containing at least two functional groups Y capable of entering into linking reactions, in the form of addition reactions, with the functional groups X.

2. A process for increasing the molecular weight of polyacrylates, wherein polyacrylates functionalized at least on some of their chain ends by functional groups X are prepared by the RAFT process using thiocarbonates selected from the group consisting of

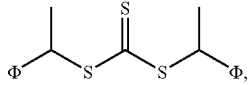
(IV)

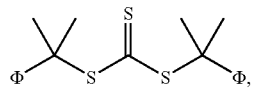
(V)

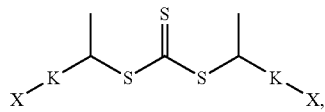
(VIII)

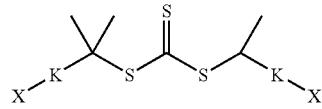
(IX)

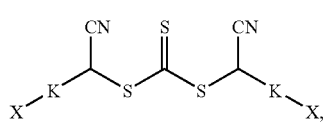
(X)

and

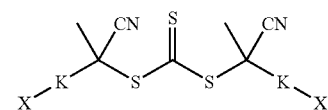
(XI)

wherein Φ represents a phenyl ring, which is unfunctionalized or functionalized by alkyl or aryl substituents linked directly or via ester or ether bridges, or represents a cyano group and k represents C$_1$ to C$_{18}$ alkyl, C$_2$ to C$_{18}$ alkenyl, C$_2$ to C$_{18}$ alkynyl, in each case linear or branched; aryl, phenyl, benzyl, aliphatic or aromatic heterocycle and optionally contains one or more groups selected from the group consisting of —NH$_2$, —NH—R$^{VI}$, —NR$^{VI}$R$^{VII}$, —NH—C(O)—R$^{VI}$, —NR$^{VI}$—C(O)—R$^{VII}$, —NH—C(S)—R$^{VI}$, —NR$^{VI}$—C(S)—R$^{VII}$,

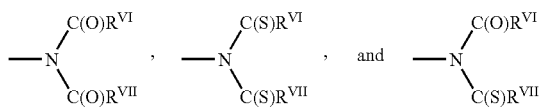

where R$^{VI}$ and R$^{VII}$ are C$_1$ to C$_{18}$ alkyl, C$_2$ to C$_{18}$ alkenyl, C$_2$ to C$_{18}$ alkynyl, in each case linear or branched; aryl, phenyl, benzyl, aliphatic or aromatic heterocycles, and are independent of one another or the same, and are then reacted with at least one compound containing at least two functional groups Y capable of entering into linking reactions, in the form of substitution reactions, with the functional groups X.

3. A process for increasing the molecular weight of polyacrylates, wherein polyacrylates functionalized at least on some of their chain ends by functional groups X are prepared by the RAFT process using thiocarbonates selected from the group consisting of

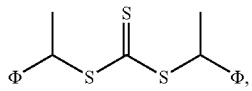
(IV)

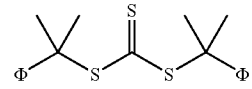
(V)

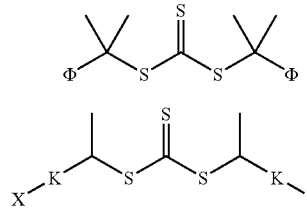
(VIII)

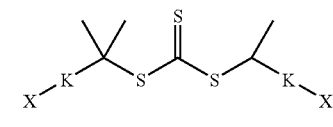
(IX)

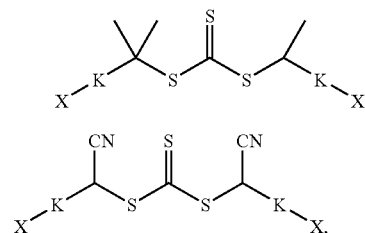
(X)

and

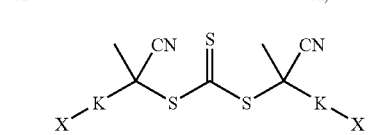
(XI)

wherein Φ represents a phenyl ring, which is unfunctionalized or functionalized by alkyl or aryl substituents linked directly or via ester or ether bridges, or represents a cyano group and k represents C$_1$ to C$_{18}$ alkyl, C$_2$ to C$_{18}$ alkenyl, C$_2$ to C$_{18}$ alkynyl, in each case linear or branched; aryl, phenyl, benzyl, aliphatic or aromatic heterocycle and optionally contains one or more groups selected from the group consisting of —NH$_2$, —NH—

$R^{VI}$, $-NR^{VI}R^{VII}$, $-NH-C(O)-R^{VI}$, $-NR^{VI}-C(O)-R^{VII}$, $-NH-C(S)-R^{VI}$, $-NR^{VI}-C(S)-R^{VII}$,

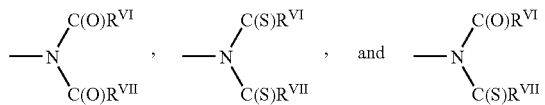

where $R^{VI}$ and $R^{VII}$ are $C_1$ to $C_{18}$ alkyl, $C_2$ to $C_{18}$ alkenyl, $C_2$ to $C_{18}$ alkynyl, in each case linear or branched; aryl, phenyl, benzyl, aliphatic or aromatic heterocycles, and are independent of one another or the same, and are then reacted with at least one compound containing at least two functional groups Y capable of bonding the polyacrylates using the functional groups X.

4. A process as claimed in claim 1, 2 or 3, wherein the polyacrylates functionalized with the functional groups X have an average molecular weight (number average) $M_n$ in the range from 2000 g/mol to 1 000 000 g/mol.

5. A process as claimed in claim 1, 2 or 3, wherein the increase in the molecular weight is achieved by a crosslinking of the polyacrylate.

6. A process as claimed in claim 1, 2 or 3, wherein the linking reactions proceed to link the polyacrylates containing the functional groups X and the compounds containing the functional groups Y linearly to one another.

7. A process as claimed in claim 1, 2 or 3, wherein the polyacrylates containing functional groups X contain at least one chain branch.

8. A process as claimed in claim 7, wherein the polyacrylates contain at least three functional groups X.

* * * * *

UNITED STATES PATENT AND TRADEMARK OFFICE
CERTIFICATE OF CORRECTION

PATENT NO. : 7,402,632 B2
APPLICATION NO. : 10/496324
DATED : July 22, 2008
INVENTOR(S) : Husemann et al.

It is certified that error appears in the above-identified patent and that said Letters Patent is hereby corrected as shown below:

In the Specification

Column 12, line 4, "C, to C,B" should read -- $C_1$ to $C_{18}$ --

Signed and Sealed this
Eleventh Day of February, 2014

Michelle K. Lee
*Deputy Director of the United States Patent and Trademark Office*